Aug. 15, 1961  R. P. PETTINGILL  2,996,043
ANIMAL TRAINING COLLAR
Filed Dec. 5, 1958
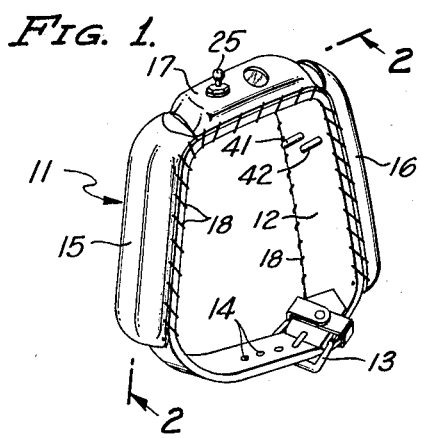
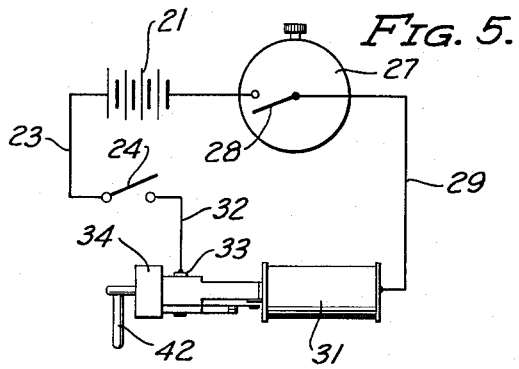
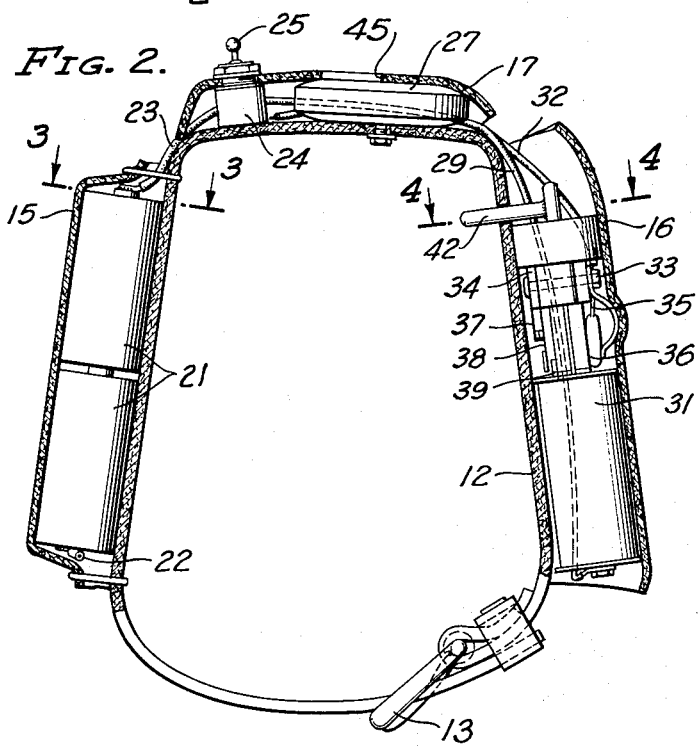
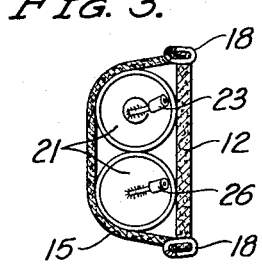
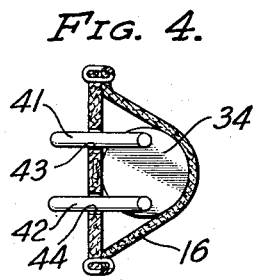
REDGE P. PETTINGILL
INVENTOR
BY Fulwider, Mattingly &
    Huntley
ATTORNEYS ns patent office 2,996,043
Patented Aug. 15, 1961

2,996,043
ANIMAL TRAINING COLLAR
Redge P. Pettingill, 6594 Orange St., Highland, Calif.
Filed Dec. 5, 1958, Ser. No. 778,365
3 Claims. (Cl. 119—131)

This invention relates to an animal training collar and a method of training animals, and more particularly to a collar adapted to be used for training coon dogs and other hounds by permitting them to follow a false trail, and, after a suitable interval of time, mildly shocking them with a high voltage low amperage alternating current, which will not hurt or injure them in any way, but will deter them from following the wrong trail or any other undesirable acts.

No other devices or methods for the training of animals are known which will perform the function and accomplish the purposes of the present invention. However, the so-called "hotshot" cattle prod as well as electrified fences have been utilized under certain circumstances to control the actions of some animals.

The present invention in one preferred embodiment consists essentially of a collar which may be secured around the neck of an animal, such as a coon dog, for training purposes and contains a pack of batteries in a pouch on one side of the collar. A manually operated switch and a timer operated switch are mounted on the top portion of the collar in another pouch and are connected in a series with the battery to a coil and vibrator unit which generates a high voltage low amperage current for mildly shocking the animals.

The coil and vibrator are mounted in a pouch on the opposite side of the collar from the batteries and substantially balance the weight of the batteries, so that the collar will not slide around the neck of the animal. A pair of prods are connected to the vibrator and extend through suitable openings in the collar whereby they may contact the neck of the animal and pass the high voltage low amperage current through the adjacent skin portion, thus mildly shocking the creature after he has been on the wrong trail for a certain period of time and thereby providing punishment immediately for the undesirable act. It will only take a few of these mild shocks at the critical point during a training program to develop a reflex action in the animal which will prevent any further misdemeanor of that particular nature.

One object of the present invention is to provide a device for training animals such as coon dogs by providing a mild form of punishment while they are actually misbehaving.

A further object of the present invention is to provide a device for the training of animals which may be readily secured around the animal's neck and timed to provide punishment at an appropriate time for any misdeed.

A further object of the present invention is to provide a method of training animals by deliberately permitting them to misbehave or commit some undesirable act, such as following the wrong trail while hunting and punishing the animal automatically during the act.

Other objects and advantages of the present invention will be apparent from the following description and drawings wherein:

FIGURE 1 is a pictorial view of one preferred embodiment of the animal training collar of the present invention;

FIGURE 2 is a sectional view of the collar taken on line 2—2 of FIGURE 1;

FIGURE 3 is a sectional view taken on the line 3—3 of FIGURE 2;

FIGURE 4 is a sectional view taken on the line 4—4 of FIGURE 2; and

FIGURE 5 is a schematic circuit diagram illustrating the electrical circuit connections between the components mounted in the collar of FIGURE 1.

Referring now to the drawings in detail and more particularly to FIGURES 1 and 2, an animal training collar 11 is illustrated wherein a heavy leather strap 12 is provided with a buckle 13 at one end which engages the perforations 14 at the other end.

The collar 11 is provided with a pouch 15 on one side and a pouch 16 on the opposite side as well as a third pouch 17 on the top portion of the collar which is secured to the leather strap 12 along opposite edges by the leather lacing 18.

As seen more clearly in FIGURE 2 the pouch 15 is adapted to contain four batteries such as the two indicated by the numeral 21 in FIGURES 2 and 3. These four batteries are preferably 1½ volt dry cells connected in series at their bottom end by the wire connection 22, and at their upper end one of the batteries is connected through a terminal and a wire connection 23 to a switch 24 which is manually operated by the knob 25. This switch could be eliminated, if desired, but facilitates the use of the device.

Another connection is made from the other top battery through a wire and connector 26, shown in FIGURE 3, to a timing mechanism 27 which may be a stop watch provided with a suitable contact 28, as indicated in FIGURE 5, and through a wire connection 29 to a coil 31. The pouch 17 is provided with a flap 30 which is visible in FIGURE 1 and provides access to the setting knob (not shown) of the timing mechanism 27.

Another wire connection 32 extends from the manually operated switch 25 to the terminal 33 of the vibrator 34. The terminal 33 is also connected through a wire 35 to a wafer condenser 36 which forms a portion of the circuit including the coil 31 and vibrator 34 which generates a high voltage and low amperage current. The vibrator 34 also includes the contacts 37, 38 and 39, the whole unit functioning in a conventional manner similar to the so-called "hotshot" cattle prod to generate a high voltage and low amperage curent going to the prods 41 and 42 which extend from the upper end of the vibrator 34 and extend inwardly through suitable openings 43 and 44 in the strap 12, as indicated in FIGURE 4, to engage the neck of the animal.

In the operation of the device the collar is secured around the neck of the animal by means of the buckle 13 with the prods 41 and 42 engaging the animal's neck. It is unnecessary to shave or otherwise prepare the animal for the use of this collar.

The timing mechanism type switching device 27, which is visible through the opening 45 formed in the pouch 17, is set to some desirable time such as 30 seconds with a maximum timing of about 15 minutes depending upon the particular tactical situation involved. If it is desired to train a hound dog for coon or possum hunting, the dog is put on the trail of a coon or possum which is crossed by a rabbit trail or the trail of some other animal, such as a deer, which he is not supposed to track, or he may be placed directly upon the trail of some other animal. The manual switch 24 is thrown by means of the knob 25, and the timing mechanism 27 is started before the dog is released.

After the dog has been released on the trail it will pick up and follow the scent of the animal which he is not supposed to be tracking, and a short time thereafter the timing mechanism will close the contacts 28 and energize the coil 31 and vibrators 34 to send a high voltage and low amperage current through the neck of the dog which will startle him and send him back to his trainer yelping, thus firmly fixing in his mind the fact that he should not be tracking the scent of this particular animal.

A relatively short program of training a dog or other animal by means of the training collar of the present invention and following the method herein will prevent any further disobedience and misbehavior in this respect.

It will be obvious that the training collar and method of the present invention may also be utilized in many other behavior problems, to prevent dogs from chasing cars and committing other misdeeds which are not desirable.

It is not necessary to shave the hair of the animal or to make any further preliminary preparations, but merely to secure the collar around the dog's or other animal's neck and let him do whatever act the trainer is trying to prevent his doing in the future.

It will be quite apparent that the shock involved is very mild and cannot severely hurt or injure the animal during the use of the training collar and the method of the present invention.

It will also be apparent that many variations and modifications of the present invention may be made within the scope of the present invention as set forth herein and as defined by the following claims.

What is claimed is:

1. An animal training collar including pouch means secured thereto and holding a coil and vibrator unit, battery means, manual switch means, timing switch means; a pair of prods operably connected to said coil and vibrator unit, said prods depending away from said collar in the direction toward the animal to be trained; electrical conducting means connecting said battery means, timing switch means, manual switch means, and coil and vibrator unit in series; and adjustable fastening means on said collar.

2. An animal training collar comprising a strap adapted to be secured around the animal's neck, a plurality of pouches secured to said strap, one of said pouches holding a plurality of batteries, a coil and vibrator unit mounted in another of said pouches on the opposite side of said collar from said battery pouch, said coil and vibrator having a pair of prods operably connected and associated therewith and extending inwardly toward the animal's neck through openings in said strap, a manual cut-off switch mounted in another of said pouches and having an operating knob extending outwardly through said pouch, a timing mechanism with a plurality of electrical contacts mounted in said last pouch, and wires operably connecting said batteries in series with said contacts in said timing mechanism and said manual switch and said coil and vibrator unit whereby upon the elapse of a given period of time, the timing device causes the dog to be shocked for improper behavior.

3. The device described in claim 2, wherein said pouches are mounted on substantially diametrically opposed sides of said collar with the switching mechanisms mounted intermediate said pouches to provide balance and weight distribution on the collar, and including adjustable fastening means on the collar for securing it about the neck of various sized animals.

References Cited in the file of this patent
UNITED STATES PATENTS

| | | |
|---|---|---|
| 2,023,950 | Carter | Dec. 10, 1935 |
| 2,212,160 | Kelly | Aug. 20, 1940 |
| 2,658,478 | Jones | Nov. 10, 1953 |
| 2,800,104 | Cameron et al. | July 23, 1957 |